United States Patent [19]

Clarke

[11] Patent Number: 5,476,237
[45] Date of Patent: Dec. 19, 1995

[54] SYNTACTIC FILM FOR THRUST REVERSER BLOCKER DOORS

[75] Inventor: James A. Clarke, E. Northport, N.Y.

[73] Assignee: Northrop Grumman Corporation, Los Angeles, Calif.

[21] Appl. No.: 80,050

[22] Filed: Jun. 18, 1993

[51] Int. Cl.[6] ............................. B64D 33/04; F02K 1/60; F02K 1/68
[52] U.S. Cl. ............................. 244/110 B; 239/265.19; 239/265.29; 239/265.37; 239/DIG. 19; 60/226.2
[58] Field of Search ................ 244/110 B; 239/265.19, 239/265.33, 265.35, 265.37, 265.39, 265.25, 265.29, DIG. 19; 60/226.1, 226.2; 264/311

[56] References Cited

U.S. PATENT DOCUMENTS

| | | | |
|---|---|---|---|
| 3,482,783 | 12/1969 | Nebiker et al. | 239/265.33 |
| 4,362,015 | 12/1982 | Fage | 239/265.29 X |
| 4,541,567 | 9/1985 | Jourdain et al. | 239/265.37 X |
| 4,637,550 | 1/1987 | Nash | 239/265.37 |
| 4,790,495 | 12/1988 | Greathouse et al. | 244/110 B |
| 4,900,488 | 2/1990 | Collins et al. | 264/311 |
| 4,994,316 | 2/1991 | Browne et al. | |
| 5,000,386 | 3/1991 | Lybarger | 239/DIG. 19 X |
| 5,251,435 | 10/1993 | Pauley | 244/54 |
| 5,315,820 | 5/1994 | Arnold | 60/226.1 |

*Primary Examiner*—William Grant
*Attorney, Agent, or Firm*—Terry J. Anderson; Carl J. Hoch, Jr.

[57] ABSTRACT

Thrust reverser blocker doors which include a syntactic film to protect the blocker doors from heat is disclosed. The blocker doors include first and second spaced layers of composite material. A first adhesive layer is disposed on the second layer and is used to bond the syntactic film to the second layer of composite material. To prevent surface erosion a protective layer can be bonded to the syntactic film by a second adhesive layer.

4 Claims, 3 Drawing Sheets

5,476,237

SYNTACTIC FILM FOR THRUST REVERSER BLOCKER DOORS

BACKGROUND OF THE INVENTION

1. Field of the Invention

The present invention relates generally to the material composition of the blocker doors of a thrust reverser and, more particularly, to a syntactic film for protecting composite material layers of the blocker doors.

2. Description of the Prior Art

It is common practice in many commercial and military jet aircraft to brake the aircraft upon landing by effectively reversing the direction of thrust of the jet engines. A common arrangement for providing such thrust reversal is to provide a pair of clam shell shaped blocker door members pivoted within the engine housing to swing from a position eclipsing openings in the engine housing to a position intercepting the thrust gases normally passing rearwardly of the engine thereby directing the gases out of the openings. Simultaneously with the swinging movement of the clam shell doors, partitions normally covering the housing openings swing outwardly and serve as a deflection or baffle wall for further guiding the outwardly deflected thrust gases forwardly thus providing the desired reverse thrust action.

Aircraft engine thrust reversers are considered by many people to be essential to the overall operational safety of today's faster more efficient airplanes. Their use makes landings safer by minimizing the number of occurrences of overruns due to long touch downs or wet or icy runways and by providing improved directional control. In addition, they are available for use in case of an aborted takeoff to assist in stopping the aircraft. However, thrust reversers add weight, complexity and cost to an aircraft.

The evolutionary development of thrust reverser design logically included the use of metals that were able to withstand the high exhaust gas temperatures produced by earlier low bypass ratio turbofan and turbojet aircraft engines. While the use of steel and titanium was essential to the early development of thrust reversers, much undesirable weight and cost accompanied the fabrication of a highly contoured highly loaded metal structure. More recently, the need to comply with Federal noise regulations has spawned a newer generation of commercial turbofan engines with moderate to high bypass ratios, in the range of 3.0 to 6.0, and has reintroduced the use of forced mixing devices. Forced mixing of the engine bypass and core exhaust flows before exiting the jet pipe produces a more uniform velocity profile over the combined exhaust area, thus reducing noise-producing shear between the exhaust flow and ambient air. Two additional benefits typically accrue; a small increase in overall engine performance and reduced peak exhaust temperatures. The lower exhaust temperatures of the newer engines permits the use of low density and potentially lower cost, high temperature, reinforced composite materials for fabrication of the thrust reverser.

SUMMARY OF THE INVENTION

The present invention is directed to the material composition of thrust reverser blocker doors. The blocker doors of the present invention include two layers of composite material laminate spaced by dead air space. Alternatively, a honeycomb structure can be used between the two composite material laminate layers. A first adhesive layer is disposed on one of the laminate layers. A syntactic film is then deposited on the first adhesive layer. The syntactic film is a sheet of glass microbubbles in a resin system such as epoxy or polyimide. When the outer surface of the syntactic film is exposed to an environment that causes surface erosion a protective layer can be bonded to the syntactic film by a second adhesive layer to prevent surface erosion.

The syntactic film is used to protect the second layer of laminate from extreme heat generated at the inner surface of each blocker door. The syntactic film performs several highly desirable functions with little weight and cost. The film distributes heat in a more even manner and reduces the temperature of the second layer of laminate. The syntactic film also reduces oxidation and cracking of the second laminate layer and degradation of the laminate mechanical properties. In addition, the film prevents degradation of the laminate due to galvanic effects. The film also prevents high thermal strains in the second laminate layer and enhances the longevity of the blocker door.

In accordance with the present invention, symmetrical blocker doors comprised of high temperature composite material each have spaced opposite forward and rear edges and a surface extending between the edges. The blocker doors can be used as part of a thrust reverser for an aircraft jet engine in a nacelle having a casing. The thrust reverser comprises, in addition to the symmetrical blocker doors, a jet exhaust nozzle having an axis, an aft end with an exit area thereat and a throat area spaced from the exit area and formed thereof. Each of the doors is pivotally mounted to pivot about a pivot axis transverse to the axis of the nozzle and disposed downstream of the engine on the nacelle. The pivot axes are in a plane intersected by the axis of the nozzle. Each of the doors has an inner surface and an outer surface and is movable between a first, stowed, position in which the inner surfaces thereof are substantially continuous with the inner surface of the nozzle and the forward and rear edges thereof are spaced from each other so that the nozzle is substantially unobstructed and a second, fully deployed, position, in which the rear edges are in abutment and the inner surfaces form a substantially continuous obstruction across the nozzle and aft of the nozzle in spaced relationship with the nozzle thereby blocking normal engine exhaust and redirecting such exhaust to provide a counterthrust to that normally provided by the engine. Moving means coupled to the blocker doors selectively pivots the blocker doors about their axes to desired positions in directions toward and away from each other. Latching means releasably latch the blocker doors in the stowed position.

Each of the blocker doors is substantially semicylindrical in configuration and has opposite substantially semicircular forward and rear edges and a substantially semicylindrical surface extending between the edges, a concave substantially cylindrical inner surface and a convex substantially cylindrical outer surface. Each of the blocker doors tapers downward from a maximum lateral distance between the forward and rear edges at a radial distance from the pivot axis thereof along the intersection of a plane perpendicular to the pivot axis at the center thereof and a plane through the pivot axis to a juncture of the forward and rear edges at the pivot axis. The inner surfaces of each of the blocker doors are spaced from each other by the diameter of the blocker door substantially coincident with the pivot axis.

The engine exhaust flow is directed through the exit area of the nozzle when the blocker doors are in the stowed position. They do not obstruct the exit area in this position. The doors are pivotally mounted via protruding portions of the doors whereby, when the doors are in the fully deployed position, their inner surfaces are spaced from the exit area of the nozzle sufficiently to cause the doors to direct the engine exhaust flow at an upstream angle. The exhaust from the engine is then directed substantially back toward the throat area outside the nacelle.

DETAILED DESCRIPTION OF THE INVENTION

Figure 1:
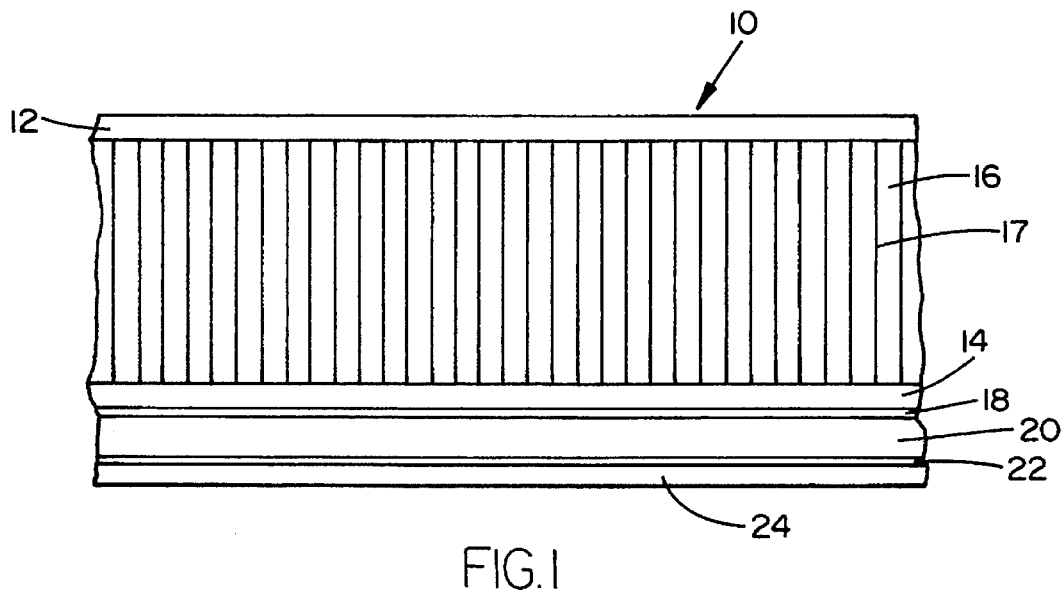
FIG. 1 is a cross-sectional view of a portion of the blocker door of the present invention.

The present invention is directed to the material composition of the blocker doors of a thrust reverser. Referring to FIG. 1, there is shown a cross-sectional view of a blocker door 10 of the present invention. First and second layers of composite material 12, 14 are spaced apart by dead air space 16. The air space 16 can be between 0.25 and 4.0 inches thick with a typical thickness of 2.0 inches. Alternatively, the dead air space 16 can include a honeycomb structure 17. Each layer 12, 14 can be comprised of high temperature graphite reinforced organic composite laminate such as, for example, graphite reinforced bismaleimides (GrBMI), ceramic reinforced aluminum or an organic composite metal hybrid. As an example, each of layers 12, 14 can be comprised of 15 plies of GrBMI having total thickness of between 0.030 and 2.0 inches with a typical value of 0.078 inches A syntactic film 20 is bonded to the second composite material layer 14 by a first adhesive layer 18. The syntactic film 20 can be a bismaleimide (BMI) syntactic film having a thickness between 0.020 and 0.25 inches with a typical thickness of approximately 0.080 inches. The syntactic film 20 is a layer of glass bubbles in a resin system such as an epoxy resin or polyimide resin system. The resin is disposed on the layer of glass bubbles. The syntactic film 20 can be formed by pouring the resin on a sheet of glass micro bubbles and then using heat treatment to cure the film. The temperature for the heat treatment can range from room temperature to 450° F. The adhesive layer 18 can be any suitable high temperature adhesive such as a bismaleimide (for example, Hexcel's HA1591), epoxy or polyimide system. In order to simplify application of the adhesive layer 18, a high temperature glass fabric such as a glass scrim can be used to carry the adhesive and form layer 18. The adhesive layer 18 has a thickness of between 0.009 inches or less.

The syntactic film 20 of the present invention has a high insulating capability which protects the second layer 14 and the blocker door from short term high temperature exposures to heat. The film 20 distributes heat in a more even manner and reduces the temperature of the second layer 14. In addition, the syntactic film 20 reduces oxidation and cracking of the composite material layer 14 and degradation of the composite material mechanical properties. The syntactic film 20 also prevents degradation of the layer 14 due to galvanic effects. The syntactic film also prevents high thermal strains on the blocker door as well as enhancing the life of the blocker door.

In the embodiment described above, the syntactic film 20 formed the outer surface of the blocker door which is exposed to heat. When the outer surface of the syntactic film 20 is exposed to an environment that would cause surface erosion, such as an air blast, a protective layer 24 can be applied and bonded to the syntactic film 20 by a second adhesive layer 22. Suitable materials for the protective layer 24 include a high temperature urethane, silicon carbide, stainless steel felt metal, Sermabond 487 and flame sprayed titanium or aluminum oxide. A suitable adhesive material for the second adhesive layer 22 can be, for example, a bismaleimide, epoxy or polyimide system.

The applicant evaluated the material composition of the blocker door of the present invention by testing small (1/10) scale models of the door, in pairs, in a temperature environment representative of that encountered in service. The model doors were tested in a hot grazing flow, representative of the newer model bypass ratio turbofan engines. The object was to duplicate the rapid heat fluxes of the true harsh operating environment as closely as possible. The candidate materials were evaluated for strength, stiffness, thermal stability in a cycling temperature environment, durability including microcracking abrasion resistance and fatigue properties. Results of the evaluation phase were used to select the most promising material or hybrid combination of materials to fabricate a full scale thrust reverser door.

A complete survey of existing F-100 TAY reverser test data was made, for example, to determine the maximum temperature experienced by the reverser door structure. The TAY is a Rolls-Royce engine. The maximum temperature measured anywhere on the doors during the TAY thrust reverser qualification tests was 600 degrees Fahrenheit. This occurred at maximum engine power in combination with a set of ambient conditions that can never be encountered in service. Based on these qualification test measurements, it was determined that the maximum temperature expected in service would be 450 degrees Fahrenheit, generated at normal reverse thrust power setting and the most critical set of ambient conditions. Although the average deployment time for the thrust reverser is estimated to be less than 45 seconds, tests were performed for up to 70 seconds.

Figure 2:
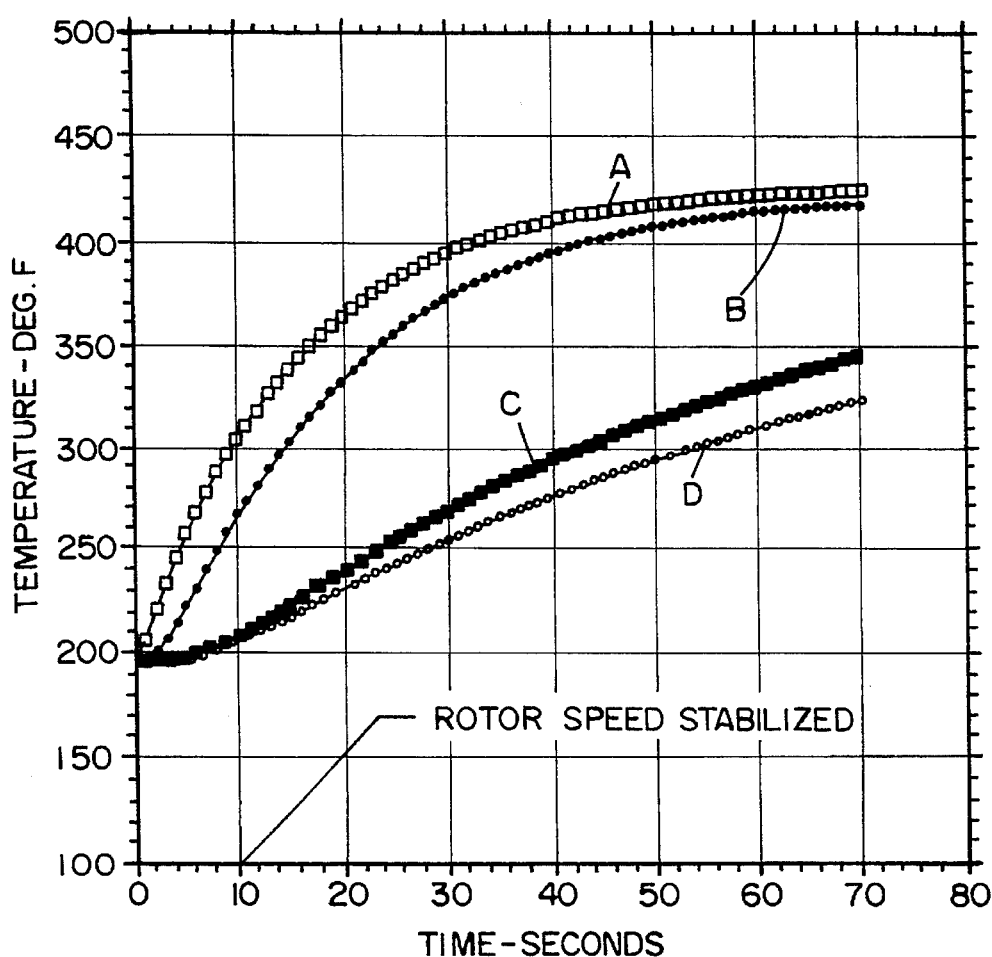
FIG. 2 is a graph of the test results of four blocker doors of the present invention having different materials for the composite laminate layers.

Four samples of blocker doors having the design of the blocker door 10 of FIG. 1 were evaluated. Each door utilized a 0.08" thick BMI syntactic film and two plies of glass fabric were used as an adhesive for both adhesive layers 18, 22. Dead air space 16 separated each composite material layer 12, 14. The first sample door A utilized titanium for each of layers 12, 14. The second sample door B used GrBMI for layers 12 and 14. The third sample door C utilized GrBMI with 0.040" of syncore insulation for each layer 12, 14. Lastly, the fourth sample door D used GrBMI with 0.125" of stainless steel felt metal for insulation and abrasion resistance. FIG. 2 shows the front plate backface temperature of each of the samples A–D. As shown in FIG. 2, each of samples A through D met the criteria needed to operate under normal reverse thrust power settings (rotor speed of 11286 RPM) and the most critical set of ambient conditions including the worst flight conditions and the hottest production engine. Even titanium, which is not a suitable material for layers 12 and 14 due to its high thermal conductivity and high density, was kept to a temperature of less than 450° F. for over 70 seconds of deployment time.

The reason for the success of the use of the syntactic film 20 which has a specific heat of 0.328 BTU/lb./° F. and a thermal conductivity of 0.06 Btu/Hr/°F./Ft, is that it distributes concentrated heat in a more uniform manner thereby reducing the temperature of the second layer 14. The film 20 accomplishes this with little weight or cost. A BMI syntactic film has a density of only 0.023 lbs/cu.in. In addition, a thrust reverser utilizing the blocker door material composition of the present invention realizes the potential weight and cost savings offered by lightweight, high temperature composite materials in the design and fabrication and may be used on newer, moderate to high bypass ratio, mixed flow turbofan engines. A weight savings is achievable merely by virtue of the inherently high specific strength and stiffness properties of advanced composites, that is, high strength and stiffness per unit weight. A saving in manufacturing cost may be achieved by reducing parts counts by cocuring structure. Thus, instead of fabricating numerous smaller detailed parts, each requiring it's own set of dimensional tolerances which must be held tightly to keep the buildup of tolerances within some reasonable bounds, larger subcomponents, incorporating much more of the detailed geometry in a single part, can be made.

The thrust reverser described herein may be any suitable known thrust reverser such as, for example, that described in U.S. Pat. No. 4,790,495 assigned to the same assignee as the present invention and incorporated herein by reference in basic concept and general configuration, except for the material and construction of the blocker doors. Basically, target-type deflector doors are hinged for deployment about a fixed axis by means of actuation about single fixed pivots mounted on support structure on either side of the engine nacelle rearward portion. The deflector door's outer surfaces are shaped to match existing aerodynamic contours of the aircraft engine nacelle to provide a lower boattail angle for improved drag characteristics in the stowed or normal flight position. In that position, the deflector door interior configuration comprises a portion upstream of the engine exhaust nozzle exit plane and a downstream "fishmouth" portion through which flows hot engine exhaust gases surrounded circumferentially by cool air discharged from the engine fan. The geometry of the stowed fishmouth is sized and shaped to take advantage of mixing and shearing action between the exhaust streams so as to produce a desired variable area nozzle effect on the engine operation and thereby improve its forward thrust performance. The geometry of the upstream portion of the inside surface of the doors is sized and shaped with end plates so that when the deflector doors move to the deployed position, the exhaust streams are diverted outward and forward to produce a desire level of reverse thrust.

Figure 3:
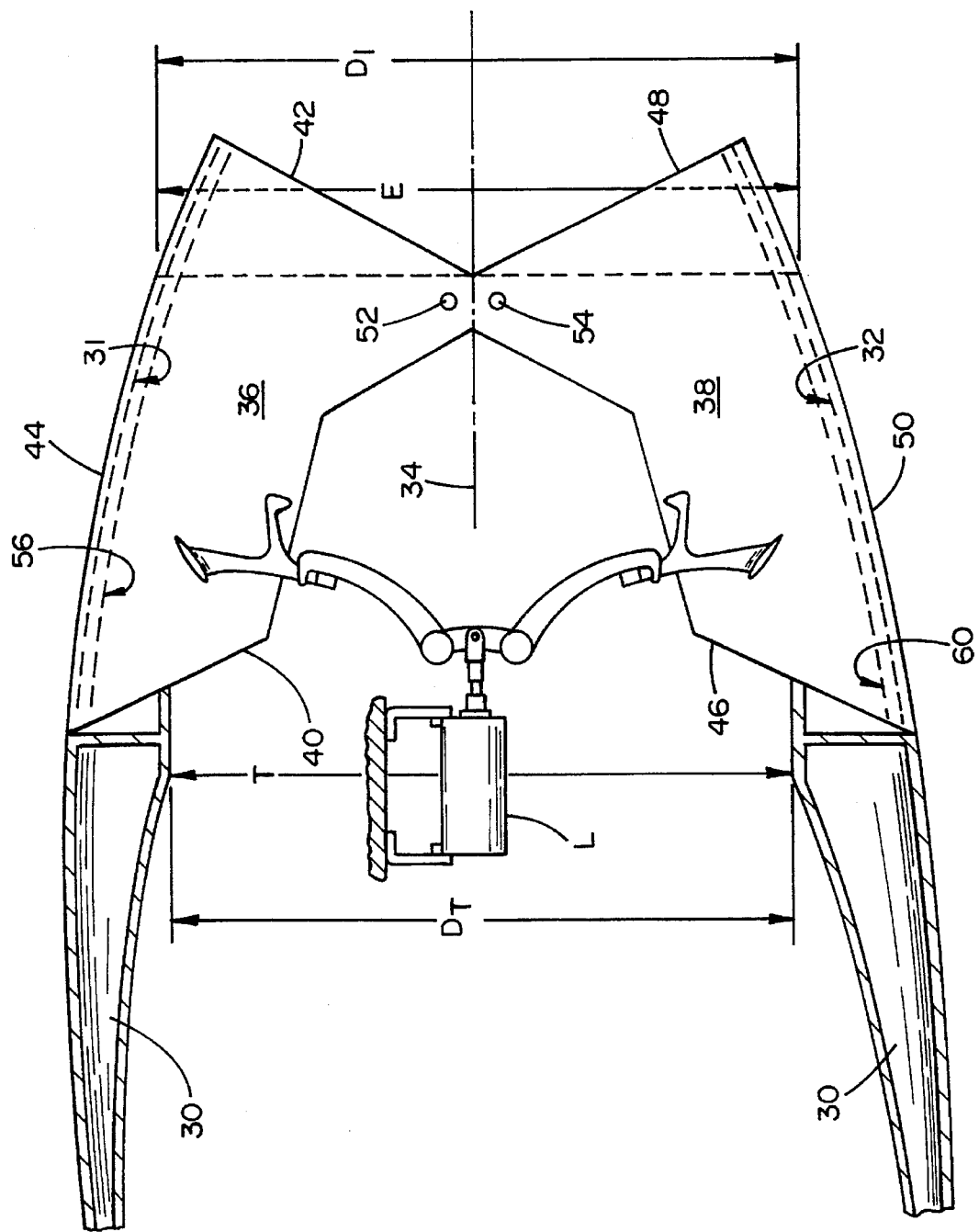
FIG. 3 is a schematic diagram in partial cross-section of a thrust reverser for use with the blocker doors of the present invention with the blocker doors in a stowed position.

Referring now to FIG. 3, there is shown a thrust reverser which can be used in accordance with blocker doors having the material composition of the present invention. The thrust reverser is for an aircraft jet engine (not shown in the FIGS.) in a nacelle. The nacelle has a casing 30. The engine has a jet exhaust nozzle 31 with an inner surface 32 and an axis 34. The jet exhaust nozzle 31 has an aft end with an exit area E thereat having a diameter $D_1$ and a throat area T spaced from said exit area and forward thereof. The throat area T has a diameter $D_T$.

The thrust reverser of the invention comprises two symmetrical blocker doors each having an axis substantially adjacent and substantially parallel to the axis 34 of the nozzle 31. Thus, an upper blocker door 36 has an axis coincident with the axis 34 of the nozzle 31 an a lower blocker door 38 has an axis coincident with said axis 34.

Each of the doors 36 and 38 is substantially semicylindrical in configuration and has opposite substantially semicircular forward and rear edges and a substantially semicircular forward and rear edges and a substantially semicylindrical surface extending between said edges. Thus, the upper blocker door 36 is substantially semicylindrical in configuration and has opposite substantially semicircular forward and rear edges 40 and 42, respectively, and a substantially semicylindrical surface 44 extending between said edges. The lower blocker door 38 is substantially semicylindrical in configuration and has opposite substantially semicircular forward and rear edges 46 and 48, respectively, and a substantially semicylindrical surface 50 extending between said edges.

The upper blocker door is pivotally mounted to pivot about a pivot axis 52 transverse to the nozzle 31 and disposed downstream of the engine in the nacelle. The lower blocker door 38 is pivotally mounted to pivot about a pivot axis 54 transverse and substantially diametrical with respect to the nozzle 31 and disposed downstream of the engine in the nacelle. The pivot axes 52 and 54 are in a plane intersected by the axis 34 of the nozzle 31, transverse to the plane of the sheet of illustration of FIG. 3 and transverse to said axis of said nozzle.

Each of the blocker doors has a concave substantially cylindrical inner surface and a convex substantially cylindrical outer surface. Thus, the upper blocker door 36 has a concave substantially cylindrical inner surface 56 and a convex substantially cylindrical outer surface 44 and the lower blocker door 38 has a concave substantially cylindrical inner surface 60 and a convex substantially cylindrical outer surface 50.

The blocker doors 36 and 38 are movable between a first, stowed, position in which the inner surfaces 56 and 60, respectively, thereof are substantially contiguous with the inner surface 32 of the nozzle 31 and the forward and rear edges 40 and 42, respectively, of the upper blocker door 36 are spaced from the forward and rear edges 46 and 48, respectively, of the lower blocker door 38, so that the nozzle is substantially unobstructed.

The thrust reverser of the invention is provided with a latching system L for releasably latching the blocker doors 36 and 38 in their stowed position. The latching system may comprise any suitable known type such as, for example, that disclosed in U.S. Pat. No. 4,790,495 for latching the blocker doors 36 and 38 in the stowed position, as shown in FIG. 3.

Figure 4:
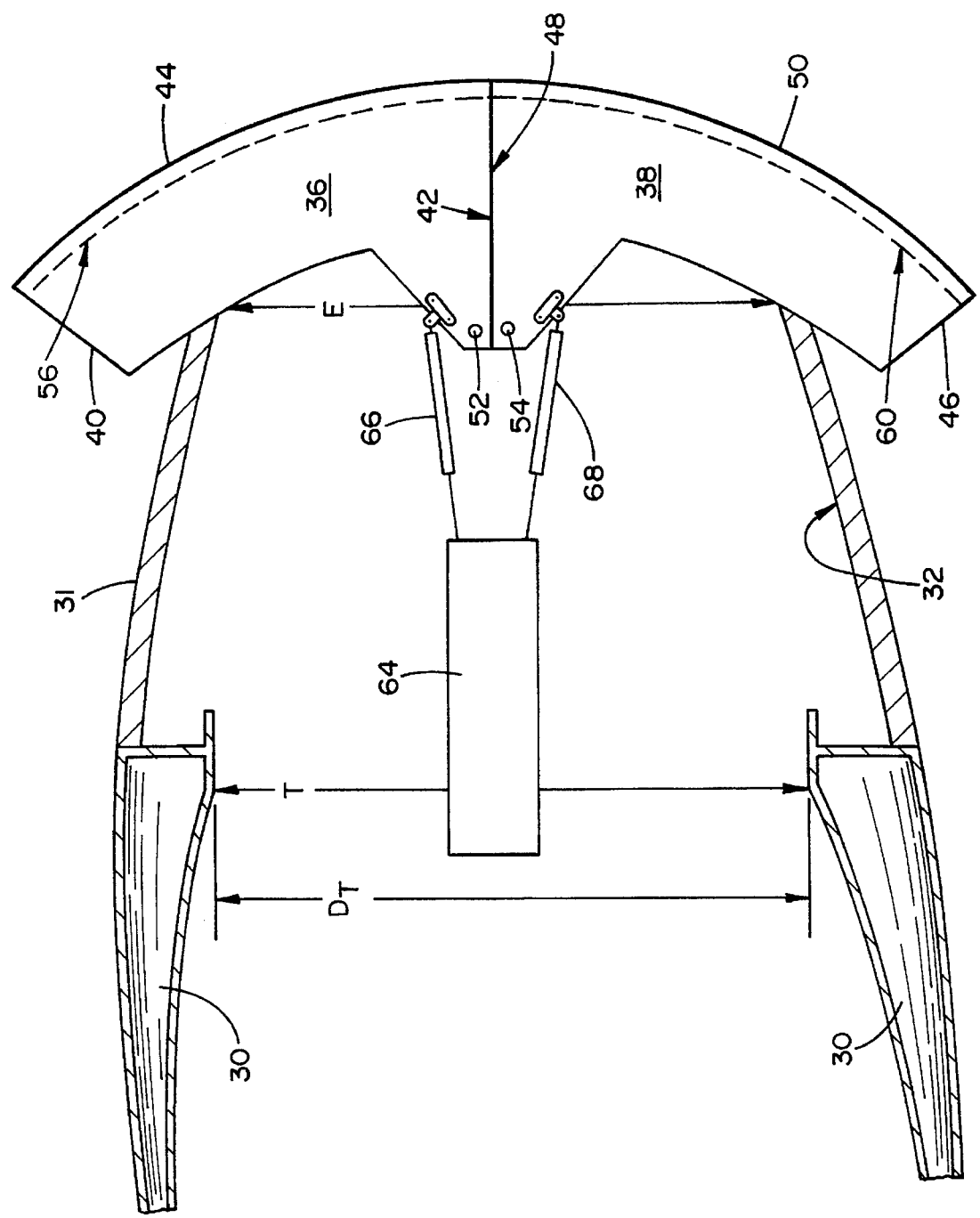
FIG. 4 is a schematic diagram in partial cross-section of the thrust reverser of FIG. 3 with the blocker doors in a fully deployed position.

As illustrated in FIG. 4, the blocker doors 36 and 38 are movable to a second fully deployed, position in which the rear edges 46 and 48 of the upper and lower blocker doors 36 and 38 respectively, are in abutment, whereby the inner surfaces of said blocker doors form a continuous obstruction across the nozzle 30 thereby substantially blocking said nozzle.

The blocker doors 36 and 38 are also movable to a plurality of intermediate positions in which the inner surfaces 56 and 60, respectively, and the outer surfaces 44 and 50, respectively, thereof are spaced from the inner surface 32 of the nozzle 31 and the forward and rear edges 40 and 42, respectively, of the upper blocker door 36 are spaced from the forward and rear edges 46 and 48, respectively, of the lower blocker door 38 so that said nozzle is partially obstructed or narrowed.

A moving device 64 of any suitable known type, which may comprise a hydraulic system, is coupled to the blocker doors 36 and 38 for selectively pivoting said doors about their axes 52 and 54, respectively, in directions toward and away from each other. The moving device may comprise the hydraulic system disclosed in U.S. Pat. No. 4,790,495. A first, or upper, push rod 66 couples the moving device 64 to the upper blocker door 36 and a second, or lower, push rod 68 couples said moving device to the lower blocker door 38. The first push rod 66 is preferably coupled to the outer surface 44 of the upper blocker door in the area of the pivot 52 thereof, as shown in FIG. 4. In such case, the second push rod 68 is preferably coupled to the outer surface 62 of the lower blocker door 38 in the area of the pivot 13 thereof. Alternatively, the first push rod 66 may be coupled to the inner surface 56 of the upper blocker door 36 and the second push rod 68 may then be coupled to the inner surface 60 of the lower blocker door 38.

Although shown and described in what are believed to be the most practical and preferred embodiments, it is apparent that departures from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

What is claimed is:

1. A thrust reverser blocker door for an aircraft jet engine comprising:

first and second spaced layers of composite material wherein each of said layers has spaced opposite forward and rear edges and a surface extending between said edges, said first layer of composite material forming an exposed outer surface of said blocker door;

a first layer of adhesive material disposed on said second layer of composite material;

a syntactic film disposed on said first layer of adhesive material;

a second layer of adhesive material disposed on said syntactic film; and a protective layer of erosion resistant material disposed on said second layer of adhesive material.

2. The blocker door of claim 1, wherein said erosion resistant material comprises a high temperature erosion material selected from the group consisting of urethane, silicon carbide, titanium and aluminum oxide.

3. The blocker door of claim 1, wherein said first and second layers of adhesive material comprise an adhesive material selected from the group consisting of bismaleimide, epoxy and polyimide systems.

4. A thrust blocker door for an aircraft jet engine comprising:

first and second spaced layers of composite material comprising high temperature graphite reinforced bismeleimides, wherein each of said layers has spaced opposite forward and rear edges and a surface extending between said edges, said first layer of composite material forming an exposed outer surface of said blocker door;

a first layer of adhesive material disposed on said second layer of composite material, wherein said first layer of adhesive material comprises a layer of a high temperature glass fabric having disposed thereon an adhesive material selected from the group consisting of bismaleimide, epoxy and polyimide systems; and a syntactic film disposed on said first layer of adhesive material, wherein said syntactic film comprises a sheet of glass bubbles having disposed thereon a resin layer, wherein said resin layer comprises a resin selected from the group consisting of epoxy and polyimide.

* * * * *